US009445288B2

(12) United States Patent
Peitzer et al.

(10) Patent No.: US 9,445,288 B2
(45) Date of Patent: *Sep. 13, 2016

(54) SETTING VOICE AND DATA PRIORITY USING A REGISTRATION MESSAGE

(71) Applicant: AT&T MOBILITY II LLC, Atlanta, GA (US)

(72) Inventors: Haywood Peitzer, Randolph, NJ (US); Darwin Parra, Austin, TX (US)

(73) Assignee: AT&T Mobility II LLC, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/696,689

(22) Filed: Apr. 27, 2015

(65) Prior Publication Data
US 2015/0230195 A1    Aug. 13, 2015

Related U.S. Application Data

(63) Continuation of application No. 14/090,606, filed on Nov. 26, 2013, now Pat. No. 9,020,483.

(51) Int. Cl.
*H04M 3/00* (2006.01)
*H04W 24/02* (2009.01)
(Continued)

(52) U.S. Cl.
CPC ............. *H04W 24/02* (2013.01); *H04L 47/10* (2013.01); *H04M 3/00* (2013.01); *H04W 8/22* (2013.01)

(58) Field of Classification Search
CPC ... H04W 8/245; H04W 60/00; H04W 88/06; H04L 47/10
USPC ............... 455/418, 435.1, 552.1; 370/395.42
See application file for complete search history.

(56) References Cited

U.S. PATENT DOCUMENTS

| 4,001,693 A | 1/1977 | Stackhouse et al. |
| 4,742,560 A * | 5/1988 | Arai ........................ H04W 8/04 455/434 |

(Continued)

FOREIGN PATENT DOCUMENTS

| EP | 1792441 | 3/2012 |
| WO | WO 02/099607 | 12/2002 |

OTHER PUBLICATIONS

Sauter, Martin, "doesBenefitFromBatteryConsumptionOptimisation," WirelessMoves, Thoughts on the Evolution of Wireless Networks and Mobile Web 2.0, Mar. 22, 2011.

(Continued)

*Primary Examiner* — Danh Le
(74) *Attorney, Agent, or Firm* — Hartman & Citrin LLC

(57) ABSTRACT

Concepts and technologies are disclosed herein for setting voice and data priority using a registration message. According to some embodiments, a processor that executes a voice and data priority application can determine a class of device associated with a communication device, a capability indicator that indicates if the communication device is capable of transmitting data communications and if the communication device is capable of transmitting voice communications, and a priority indicator that indicates if data communications are to be prioritized over voice communications for the communication device. The processor also can generate a voice and data priority indicator that indicates the class of device, the capability indicator, and the priority indicator, and save the voice and data priority indicator at a memory associated with the communication device. The communication device can be configured to generate a registration message that includes the voice and data indicator when registering with a network.

20 Claims, 8 Drawing Sheets

(51) Int. Cl.
*H04L 12/801* (2013.01)
*H04W 8/22* (2009.01)

(56) References Cited

U.S. PATENT DOCUMENTS

| | | | |
|---|---|---|---|
| 5,153,905 A | 10/1992 | Bergeron et al. | |
| 5,408,419 A * | 4/1995 | Wong | H04W 8/20 455/433 |
| 5,862,471 A * | 1/1999 | Tiedemann, Jr. | H04M 15/28 379/114.01 |
| 5,884,172 A * | 3/1999 | Sawyer | H04W 60/00 455/435.1 |
| 6,694,145 B2 | 2/2004 | Riikonen et al. | |
| 6,731,625 B1 | 5/2004 | Eastep et al. | |
| 6,778,653 B1 | 8/2004 | Kallas et al. | |
| 6,909,708 B1 | 6/2005 | Krishnaswamy et al. | |
| 6,961,559 B1 | 11/2005 | Chow et al. | |
| 7,002,979 B1 | 2/2006 | Schneider et al. | |
| 7,003,331 B2 | 2/2006 | Cromer et al. | |
| 7,233,605 B1 | 6/2007 | Oran | |
| 7,274,929 B1 | 9/2007 | Banginwar | |
| 7,558,965 B2 | 7/2009 | Wheeler et al. | |
| 7,577,113 B2 | 8/2009 | Alon et al. | |
| 7,634,269 B2 * | 12/2009 | Gallagher | H04W 16/16 370/331 |
| 7,908,295 B2 | 3/2011 | Hindle et al. | |
| 8,045,700 B2 | 10/2011 | Bruce et al. | |
| 8,135,443 B2 | 3/2012 | Aleksic et al. | |
| 8,249,106 B2 | 8/2012 | Samuel et al. | |
| 8,264,987 B2 | 9/2012 | Baum et al. | |
| 8,270,421 B2 | 9/2012 | Elliott et al. | |
| 8,351,341 B1 | 1/2013 | Callon | |
| 8,498,592 B2 | 7/2013 | Mishra et al. | |
| 8,769,140 B2 | 7/2014 | Chen et al. | |
| 8,780,711 B2 | 7/2014 | Baliga et al. | |
| 9,161,266 B2 | 10/2015 | Slack | |
| 2001/0014095 A1 | 8/2001 | Kawahata et al. | |
| 2004/0096045 A1 * | 5/2004 | Suffern | H04M 1/656 379/93.32 |
| 2004/0260466 A1 * | 12/2004 | Ichihara | G01C 21/343 701/420 |
| 2005/0180397 A1 | 8/2005 | Yeom | |
| 2005/0190756 A1 | 9/2005 | Mundra et al. | |
| 2005/0226227 A1 | 10/2005 | Kim et al. | |
| 2006/0063538 A1 | 3/2006 | Ishii | |
| 2007/0081498 A1 | 4/2007 | Niwano | |
| 2009/0099851 A1 | 4/2009 | Pilati et al. | |
| 2009/0201862 A1 | 8/2009 | Okker et al. | |
| 2010/0128645 A1 | 5/2010 | Lin et al. | |
| 2010/0195643 A1 * | 8/2010 | Kodali | H04W 48/18 370/352 |
| 2011/0131409 A1 | 6/2011 | Cohen et al. | |
| 2012/0034910 A1 | 2/2012 | Fang et al. | |
| 2012/0214468 A1 | 8/2012 | Tadayon et al. | |
| 2012/0315960 A1 | 12/2012 | Kim | |
| 2013/0054493 A1 | 2/2013 | McDysan et al. | |
| 2013/0301500 A1 | 11/2013 | Koc et al. | |
| 2015/0056947 A1 | 2/2015 | Panchal et al. | |
| 2015/0103953 A1 | 4/2015 | Lee et al. | |

OTHER PUBLICATIONS

Sharma et al., "Capability-Based Modeling of Services in Mobile Systems," [retrieved from www.ee.iitb.ac.in/~hpc/.old_studs/hrishi_page/rsch/cap_details.pdf on Oct. 11, 2013].

U.S. Notice of Allowance dated Dec. 18, 2014 in U.S. Appl. No. 14/090,606.

Balasubramanian et al., "Energy Consumption in Mobile Phones: A Measurement Study and Implications for Network Applications," Proceedings of the 9th ACM SIGCOMM conference on Internet Measurement Conference, Nov. 4-6, 2009, ACM.

* cited by examiner

| Indicator | | | | Device Types | Network Tuning Profile | | | |
|---|---|---|---|---|---|---|---|---|
| V | D | T | P | | RF Channel/Carrier | Scheduler | Drop PS if Marginal? | Drop CS if Marginal? |
| 1 | 1 | 1 | 1 | mRAB stationary-data priority | Shared channel - least coverage small cell/PCS | Max Resources | N | N |
| 1 | 1 | 1 | 0 | mRAB stationary-voice priority | Shared channel - least coverage small cell/PCS | Medium | Y | N |
| 1 | 1 | 0 | 1 | EDO (connected car) | Shared Channel - best coverage | Max Resources | N | N |
| 1 | 1 | 0 | 0 | mRAB (smartphone) | Shared Channel - best coverage | Min Resources | Y | N |
| 1 | 0 | 1 | 1 | High Quality Stationary Voice | Shared Channel - best coverage cell/PCS | None | Y | N |
| 1 | 0 | 1 | 0 | Stationary voice only | Shared Channel - best coverage | None | Y | N |
| 1 | 0 | 0 | 1 | High Quality Mobile Voice | Best Voice Channel - Best Coverage | None | Y | N |
| 1 | 0 | 0 | 0 | Mobile voice only (feature phone) | Best Voice Channel - Best Coverage | None | Y | N |
| 0 | 1 | 1 | 1 | Mobile data only modem | Data Only Channel | Medium | N | Y |
| 0 | 1 | 1 | 0 | Data only - low priority (M2M) | Shared Channel - least coverage | Min Resources | N | Y |
| 0 | 1 | 0 | 1 | Stationary data only modem | Shared Channel - least coverage | Max Resources | N | Y |
| 0 | 1 | 0 | 0 | Mobile Data only - lower cost | Shared Channel | Medium | Y | Y |
| 0 | 0 | 1 | 1 | Reserved | | | | |
| 0 | 0 | 1 | 0 | Reserved | | | | |
| 0 | 0 | 0 | 1 | Reserved | | | | |
| 0 | 0 | 0 | 0 | Telemtry Class - M2M | Least Coverage | Not Used | Not Used | Not Used |

FIG. 4

SETTING VOICE AND DATA PRIORITY USING A REGISTRATION MESSAGE

CROSS-REFERENCE TO RELATED APPLICATION

This application is a continuation of and claims priority to U.S. patent application Ser. No. 14/090,606, entitled "Setting Voice and Data Priority Using a Registration Message," filed Nov. 26, 2013, now U.S. Pat. No. 9,020,483, which is incorporated by reference herein in its entirety.

BACKGROUND

Traditionally, network operators provided multiple networks to support different types of devices. For example, network operators provided wireless networks to support wireless devices and wireline networks to support non-wireless devices. These divisions and/or separations typically were required because wireless and non-wireless devices historically operated and communicated with networks in different ways.

Some network operators have pursued the notion of unified networks, which may communicate with disparate devices in a similar or even identical manner. Thus, some modern networks may treat wireless devices in a manner that is substantially similar (or even identical) to the manner in which non-wireless devices are treated. In fact, from the perspective of a network operator, all devices may be treated the same way before, during, and even after services are provisioned to the devices by the network.

In some cases, provisioning services that are not needed by various devices has no adverse impact, since these services may simply not be used by the devices. In some other embodiments, however, this unified or consistent approach to treating and/or registering devices may adversely affect performance of the network and/or the devices. For example, treating a set-top box ("STB") or set-top unit ("STU") in a manner that is similar or even identical to the manner in which a mobile device such as a smartphone is treated may result in less than optimal performance.

In particular, STBs and/or STUs may not have use for voice communications, and as such, provisioning these devices with voice communications may be unnecessary. Furthermore, preparing the network for complex handoff situations for non-mobile devices may be unnecessary and/or may waste valuable resources. Because the networks are attempting to provide unified services and/or treatment, however, such wasted resources may be necessary.

SUMMARY

The present disclosure is directed to setting voice and data priority using a registration message. A voice and data priority indicator can be generated for a device such as, for example, a communication device. The voice and data priority can indicate, for example, how communications with the communication device are to be conducted. In particular, some embodiments of the concepts and technologies described herein include indicating, in the voice and data priority indicator, how data communications and/or voice communications are to be prioritized, particularly in the event of degradation of voice or data communications.

In some embodiments, the voice and data priority indicator can include multiple indicators. In one particular embodiment, the voice and data priority indicator can include a multi-bit indicator, where the bits can indicate capabilities of the device, how data and/or voice communications are to be prioritized, and a class of device. In some embodiments, the multi-bit indicator can have four bits, one bit can indicate an ability of the device to send or receive data communications, one bit can indicate an ability of the device to send or receive voice communications, one bit can indicate a class of the device (mobile or stationary), and one bit can indicate if voice communications are prioritized over data communications or if data communications are prioritized over voice communications.

According to various embodiments of the concepts and technologies described herein, a device can execute a voice and data priority application that can be used to generate and store a voice and data priority indicator. In some embodiments, a communication device can execute the voice and data priority application and in some other embodiments, other devices can execute the voice and data priority application. The voice and data priority indicator can be generated and stored at a data storage device associated with and/or accessible to the communication device. In some embodiments, the voice and data priority indicator can be stored in a subscriber identity module associated with the communication device, and in some other embodiments, the voice and data priority indicator can be stored in a memory or other data storage device associated with the communication device.

The communication device can be configured, for example via execution of the voice and data priority application, to generate a registration message at various times and/or in response to various conditions. For example, the communication device can generate the registration message, for example, when the communication device is powered on, when the communication device attaches to a new network, when the communication device roams between networks and/or otherwise connects to a new network or component thereof, combinations thereof, or the like. The registration message can include the voice and data priority indicator.

The voice and data priority indicator can be received by a network or network device and used to configure the network or network device for communications in accordance with the voice and data priority indicator. According to various embodiments, the voice and data priority indicator can be configured to control communications at the network without requiring database lookups and/or involvement from various software or hardware components. In particular, the voice and data priority indicator can be used to configure hardware to communication in accordance with the voice and data priority indicator at the hardware level. Thus, some embodiments of the concepts and technologies described herein can be used to control communications associated with the device by providing the registration message without any additional or alternative operations.

According to one aspect of the concepts and technologies disclosed herein, a method is disclosed. The method can include determining, by a processor that executes a voice and data priority application, a class of device associated with a communication device, a first capability indicator that indicates if the communication device is capable of transmitting data communications, a second capability indicator if the communication device is capable of transmitting voice communications, and a priority indicator that indicates if data communications are to be prioritized over voice communications for the communication device. The method also can include generating, by the processor, a voice and data priority indicator that indicates the class of device, the first capability indicator, the second capability indicator, and the priority indicator. The voice and data priority indicator can be saved at a memory associated with the communication device. The communication device can generate a registration message that can include the voice and data indicator when registering with a communications network.

In some embodiments, the voice and data priority indicator can include a multi-bit indicator that can be included in the registration message. In some embodiments, the voice and data priority indicator can include a four bit indicator. The four bit indicator can include a first bit indicating a voice capability of the communication device, a second bit indicating a data capability of the communication device, a third bit indicating a class of device for the communication device, and a fourth bit indicating if the data communications are to be prioritized over the voice communications. In some embodiments, the registration message can include a DoesNotBenefitFromBatteryConsumptionOptimisation information element, and the DoesNotBenefitFromBatteryConsumptionOptimisation information element can include the four bit indicator.

In some embodiments, the class of device can include an indicator that indicates that the communication device is a mobile device or a stationary device. In some embodiments, the method further can include determining, by the processor, if the voice and data priority indicator is to be updated, and if a determination is made that the voice and data priority indicator is to be updated, updating the voice and data priority indicator, and sending the voice and data priority indicator to a network element. In some embodiments, the processor can be associated with a computing device, and the voice and data priority indicator can be stored at a subscriber identity module associated with the communication device. In some embodiments, the processor can be associated with the communication device, and the voice and data priority indicator can be stored at a subscriber identity module associated with the communication device.

In some embodiments, the voice and data priority indicator can be stored at a data storage device associated with the communication device. In some embodiments, the method can include transmitting the voice and data priority indicator to a network element. The voice and data priority indicator can configure the network element for communications in accordance with the voice and data priority indicator. In some embodiments, the network element can include a base transceiver station associated with a wireless network.

According to another aspect of the concepts and technologies disclosed herein, a system is disclosed. The system can include a processor and a memory. The memory can store computer-executable instructions that, when executed by the processor, cause the processor to perform operations. The operations can include determining a class of device associated with a communication device, determining a data capability indicator that indicates if the communication device is capable of transmitting data communications, determining a voice capability indicator that indicates if the communication device is capable of transmitting voice communications, and determining a priority indicator that indicates if data communications are to be prioritized over voice communications for the communication device. The operations further can include generating a voice and data priority indicator that indicates the class of device, the data capability indicator, the voice capability indicator, and the priority indicator. The operations also can include saving the voice and data priority indicator at a memory associated with the communication device. The communication device can generate a registration message that can include the voice and data indicator when registering with a communications network.

In some embodiments, the voice and data priority indicator can include a four bit indicator. The four bit indicator can include a first bit corresponding to the class of device, a second bit corresponding to the data capability indicator, a third bit corresponding to the voice capability indicator, and a fourth bit corresponding to the priority indicator. In some embodiments, the registration message can include a DoesNotBenefitFromBatteryConsumptionOptimisation information element, and the DoesNotBenefitFromBatteryConsumptionOptimisation information element can include the four bit indicator. In some embodiments, the class of device can include an indicator that indicates that the communication device is a mobile device or a stationary device. In some embodiments, the voice and data priority indicator can be stored at a subscriber identity module associated with the communication device.

According to yet another aspect, a computer storage medium is disclosed. The computer storage medium can have stored thereon computer-executable instructions that, when executed by a processor, cause the processor to perform operations. The operations can include determining a class of device associated with a communication device, determining a data capability indicator that indicates if the communication device is capable of transmitting data communications, determining a voice capability indicator that indicates if the communication device is capable of transmitting voice communications, and determining a priority indicator that indicates if data communications are to be prioritized over voice communications for the communication device. The operations also can include generating a voice and data priority indicator that indicates the class of device, the data capability indicator, the voice capability indicator, and the priority indicator. The operations also can include saving the voice and data priority indicator at a memory associated with the communication device. The communication device can generate a registration message that can include the voice and data indicator when registering with a communications network.

In some embodiments, the voice and data priority indicator can include a four bit indicator. The four bit indicator can include a first bit corresponding to the class of device, a second bit corresponding to the data capability indicator, a third bit corresponding to the voice capability indicator, and a fourth bit corresponding to the priority indicator. In some embodiments, the registration message can include a DoesNotBenefitFromBatteryConsumptionOptimisation information element, and the DoesNotBenefitFromBatteryConsumptionOptimisation information element can include the four bit indicator. In some embodiments, the voice and data priority indicator can be stored at a subscriber identity module associated with the communication device.

Other systems, methods, and/or computer program products according to embodiments will be or become apparent to one with skill in the art upon review of the following drawings and detailed description. It is intended that all such additional systems, methods, and/or computer program products be included within this description, be within the scope of this disclosure.

BRIEF DESCRIPTION OF THE DRAWINGS

FIG. 4 is a line diagram illustrating an example network tuning profile, according to one illustrative embodiment.

DETAILED DESCRIPTION

Figure 1:
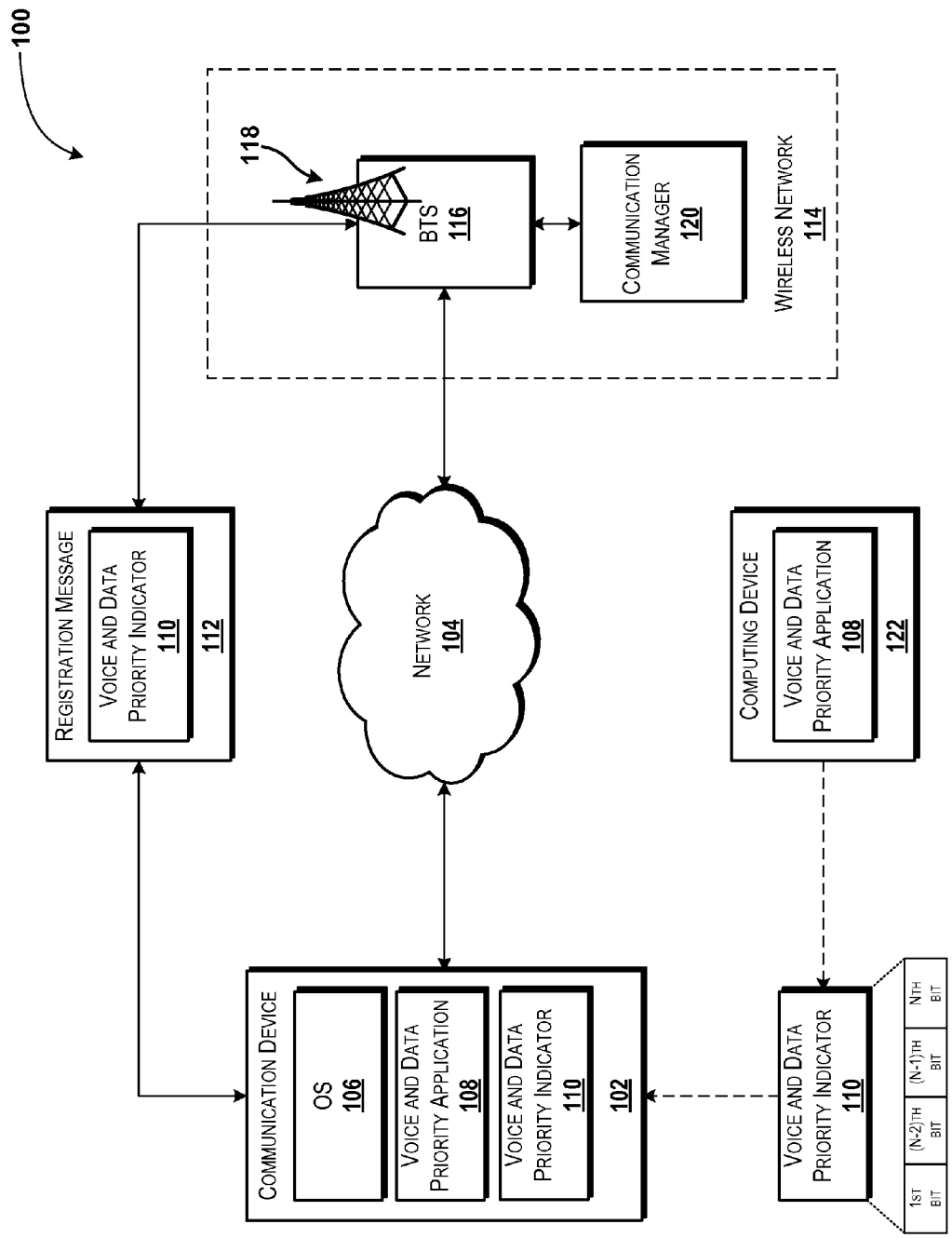
FIG. 1 is a system diagram illustrating an illustrative operating environment for the various embodiments disclosed herein.

The following detailed description is directed to setting voice and data priority using a registration message. In some embodiments, a voice and data priority indicator can include multiple indicators. In one particular embodiment, the voice and data priority indicator can include a multi-bit indicator. The bits of the multi-bit indicator can indicate capabilities and/or communication preferences associated with a communication device. The indicators can include, for example, indicators of whether or not the communication device supports voice communications, whether or not the communication device supports data communications, whether data and/or voice communications are to be prioritized, and a class of device that indicates if the communication device is mobile or stationary.

In some embodiments, the multi-bit indicator can have four bits, one bit can indicate an ability of the communication device to send or receive data communications, one bit can indicate an ability of the communication device to send or receive voice communications, one bit can indicate a class of the communication device (mobile or stationary), and one bit can indicate if voice communications are prioritized over data communications or if data communications are prioritized over voice communications. Because additional and/or alternative indicators are possible and are contemplated, it should be understood that these examples are illustrative and therefore should not be construed as being limiting in any way.

According to various embodiments of the concepts and technologies described herein, a device can execute a voice and data priority application that can be used to generate and store a voice and data priority indicator. In some embodiments, a communication device can execute the voice and data priority application and in some other embodiments, other devices such as computing devices or the like can execute the voice and data priority application. The voice and data priority indicator can be generated and stored at a data storage device associated with and/or accessible to the communication device. In some embodiments, the voice and data priority indicator can be stored in a subscriber identity module associated with the communication device, and in some other embodiments, the voice and data priority indicator can be stored in a memory of other data storage device associated with the communication device.

The communication device can be configured, for example via execution of the voice and data priority application, to generate a registration message at various times and/or in response to various conditions. For example, the communication device can generate the registration message, for example, when the communication device is powered on, when the communication device attaches to a new network, when the communication device roams between networks and/or otherwise connects to a new network or component thereof, combinations thereof, or the like. The registration message can include the voice and data priority indicator.

The voice and data priority indicator can be received by a network or network device and used to configure the network or network device for communications in accordance with the voice and data priority indicator. According to various embodiments, the voice and data priority indicator can be configured to control communications at the network without requiring database lookups and/or involvement from various software or hardware components. In particular, the voice and data priority indicator can be used to configure hardware to communicate in accordance with the voice and data priority indicator at the hardware level. Thus, some embodiments of the concepts and technologies described herein can be used to control communications associated with the device by providing the registration message without any additional or alternative operations.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

Referring now to FIG. 1, aspects of an operating environment 100 for various embodiments of the concepts and technologies disclosed herein for setting voice and data priority using a registration message will be described, according to an illustrative embodiment. The operating environment 100 shown in FIG. 1 includes a communication device 102 operating in communication with and/or as part of a communications network ("network") 104.

According to various embodiments, the functionality of the communication device 102 may be provided by one or more server computers, desktop computers, mobile telephones, laptop computers, set-top boxes, other computing systems, and the like. In particular, the functionality of the communication device 102 can be provided by almost any device that may register with a network, device, or other entity to obtaining provisioned services such as voice or data communications. For purposes of describing the concepts and technologies disclosed herein, the communication device 102 is described herein as a mobile telephone. It should be understood that this embodiment is illustrative, and should not be construed as being limiting in any way.

The communication device 102 can execute an operating system 106 and one or more application programs such as, for example, a voice and data priority application 108. The operating system 106 is a computer program for controlling the operation of the communication device 102. The voice and data priority application 108 is an executable program configured to execute on top of the operating system 106 to provide various functions as described herein for setting, using, updating, and communicating in accordance with a voice and data priority indicator included in a registration message.

The voice and data priority application 108 can be configured to generate, store, retrieve, and/or transmit a voice and data priority indicator 110 to one or more recipients. In some embodiments, the voice and data priority application 108 can be configured to generate an element for a registration message 112, where the element includes or represents the voice and data priority indicator 110. In one particular embodiment, the voice and data priority application 108 can be configured to generate a header or other element for the registration message 112, wherein the header or other element includes a single-bit or multi-bit indicator for specifying a voice and data priority.

In one embodiment, which is illustrated in FIG. 1, the voice and data priority application 108 can be configured to generate, store, access, and/or transmit a voice and data priority indicator 110 that is a four bit indicator. The four bit indicator can specify, for example, a bit that indicates if the communication device 102 is data capable, a bit that indicates if the communication device 102 is voice capable, a bit that indicates if the communication device 102 is mobile or stationary, a bit that indicates if data is to be prioritized over voice or the opposite, combinations thereof, or the like. Because the voice and data priority indicator 110 can include less than four bits, four bits, and/or more than four bits, it should be understood that this example is illustrative and therefore should not be construed as being limiting in any way. Furthermore, because a four bit voice and data priority indicator 110 can include bits directed to additional and/or alternative information, it should be understood that this example is illustrative and therefore should not be construed as being limiting in any way.

According to various embodiments, the communication device 102 can be configured, for example via execution of the voice and data priority application 108, to transmit the voice and data priority indicator 110 to a wireless network 114 or an element thereof. For example, the communication device 102 can be configured to transmit the voice and data priority indicator 110 as part of a registration message 112 that can be transmitted to a base transceiver station ("BTS") 116, for example via an antenna or tower ("tower") 118. It should be understood that this example is illustrative and therefore should not be construed as being limiting in any way.

The BTS 116 can include and/or can communicate with a module, hardware element, application, or the like, to apply the voice and data priority indicator 110 to communications occurring via the BTS 116, the tower 118, and/or the wireless network 114 in general, if desired. In one contemplated embodiment, the BTS 116 can include and/or can communicate with a communication manager 120 to apply the voice and data priority indicator 110 to communications occurring via the BTS 116. In another embodiment, the BTS 116 includes a communication manager 120 that can apply the voice and data priority indicator 110 to communications occurring via the BTS 116 at the radio level. Thus, some embodiments of the concepts and technologies described herein can allow a BTS 116 or even a radio or other transceiver within the BTS 116 to apply voice and data priority decisions at the radio level without requiring intervention from network devices, systems, hardware, software, and/or other elements. It should be understood that these examples are illustrative and therefore should not be construed as being limiting in any way.

Because various embodiments of the concepts and technologies described herein can be used to allow the communication device 102 to set a voice and data priority for communications, it can be appreciated that various voice and data priority decisions can be offloaded from one or more networks and/or network devices to radios, combiners, transceivers, or the like at a cellular or other wireless networking site such as the BTS 116, the tower 118, or the like. Furthermore, as will be illustrated and described in more detail below, the communication device 102 can be configured to update a voice and data priority via registration messages 112 and/or other communications with various entities such as, for example, the BTS 116 and/or other devices, systems, and/or networks. It should be understood that this example is illustrative and therefore should not be construed as being limiting in any way.

In some embodiments of the concepts and technologies described herein, the voice and data priority indicator 110 for a particular device such as the communication device 102 can be set by various devices or entities and loaded to or otherwise stored at the communication device 102. For example, some embodiments of the concepts and technologies described herein include storing the voice and data priority indicator 110 at a subscriber identity module ("SIM") associated with the communication device 102, a memory or other data storage device associated with the communication device 102, or the like. The voice and data priority indicator 110 can be created or generated by the communication device 102, for example by the voice and data priority application 108, or by other entities.

In one embodiment of the concepts and technologies described herein, the voice and data priority indicator 110 can be generated by a computing device 122 that is in communication with the communication device 102. The computing device 122 can include, for example, a device associated with a device manufacturer, a device retailer, a device distributer, or the like, for the communication device 102. Thus, for example, a manufacturer may generate the voice and data priority indicator 110 using the computing device 122 and store the voice and data priority indicator 110 at the communication device 102 by flashing a BIOS or SIM card, by storing the data in a memory, by configuring the communication device 102 to include the voice and data priority indicator 110 in a registration message 112, combinations thereof, or the like.

In some embodiments, the computing device 122 can host or execute an application program to provide the functionality described herein with respect to the computing device 122. For example, the computing device 122 can be configured to execute computer-executable instructions that are similar or even identical to the voice and data priority application 108 executed by the communication device 102. As such, as will be explained in more detail below, the computing device 122 can be configured to generate, store, retrieve, and/or share the voice and data priority indicator 110, in some embodiments. These and other embodiments of the concepts and technologies described herein will be illustrated and described in more detail below.

In practice, a voice and data priority indicator 110 can be generated for a particular device such as, for example, the communication device 102. According to various embodiments, the voice and data priority indicator 110 can be generated for the communication device 102 using a voice and data priority application 108 executed by the communication device 102, by a voice and data priority application 108 executed by another device such as the computing device 122, and/or by other entities. Furthermore, the voice and data priority indicator 110 can be updated or replaced at various times, by various entities, and/or for various reasons.

The voice and data priority indicator 110 can indicate, for a particular device or devices, a priority to be assigned to data communications, voice communications, other communications, combinations thereof, or the like. In one embodiment, the voice and data priority indicator 110 can include a four-bit indicator, where one bit indicates a voice capability, one bit can indicate a data capability, one bit can indicate a device type (whether the device is stationary or mobile), and one bit can indicate a data priority (whether data communicates are to be suspended or diminished if voice communications degrade). In some embodiments, the voice and data priority indicator 110 can be included as a header or other element in a registration message 112. Because the voice and data priority indicator 110 can include additional or alternative bits, non-bit indicators, and/or can be included in other types of messages and/or communications, it should be understood that these examples are illustrative and therefore should not be construed as being limiting in any way.

The voice and data priority indicator 110 can be stored at the communication device 102. In some embodiments, for example, the voice and data priority indicator 110 can be stored in a memory, a subscriber identity module ("SIM") or other device, combinations thereof, or the like. The communication device 102 can be configured to retrieve the voice and data priority indicator 110 at various times and/or for various purposes. For example, the communication device 102 can be configured to retrieve the voice and data priority indicator 110 during a power-up operation, during a registration process (e.g., when preparing a registration message 112 or the like), when roaming or changing towers or networks, at various times, combinations thereof, or the like. In the embodiment shown in FIG. 1, the communication device 102 can provide the voice and data priority indicator 110 to a wireless network 114 as part of the registration message 112 and thereby set a voice and data priority for communications via the wireless network 114. It should be understood that this example is illustrative and therefore should not be construed as being limiting in any way.

A device on the wireless network 114 or other networks and/or devices can receive the registration message 112 and recognize the voice and data priority indicator 110 as part of or as being included with the registration message 112. The wireless network 114 or a device associated with the wireless network 114 such as, for example a BTS 116, a communication manager 120, or the like, can be configured to recognize the voice and data priority indicator 110 and configure the wireless network 114 and/or components thereof to communicate in accordance with the voice and data priority indicator 110. According to various embodiments, one or more components of the wireless network 114 can be configured to apply the voice and data priority indicator 110 to communications occurring via the wireless network 114.

Furthermore, as noted above, the voice and data priority indicator 110 can be applied, in some embodiments, by devices or software modules such as a communication manager 120 that may be a stand-alone device that manages communications occurring on the wireless network 114 and/or may be a component of other devices or systems such as the BTS 116, or the like. In some other embodiments, the voice and data priority indicator 110 can be applied to communications by hardware devices such as radios, combiners, transceivers, receivers, transmitters, or the like, without involvement by other devices. Thus, the voice and data priority indicator 110 can be applied to communications in various manners including, but not limited to, at the radio level, at the device level, and/or at a control and/or signaling level such as by network operations systems or the like. It should be understood that these examples are illustrative and therefore should not be construed as being limiting in any way.

The communication device 102 can be configured to submit and/or resubmit the voice and data priority indicator 110 and/or iterations of the voice and data priority indicator 110 at various times and/or in response to various conditions. Thus, for example, the communication device 102 can submit the voice and data priority indicator 110 or an updated version thereof when registering with a new device or network, when roaming, when switching towers, at other times, combinations thereof, or the like. Thus, in addition to setting a voice and data priority for voice and/or data communications, various embodiments of the concepts and technologies described herein can be used to update or change a voice and data priority during communications and/or at other times.

FIG. 1 illustrates one communication device 102, one network 104, one BTS 116, one tower 118, one communication manager 120, and one computing device 122. It should be understood, however, that various implementations of the operating environment 100 include zero, one, or more than one communication device 102; zero, one, or more than one network 104; zero, one, or more than one BTS 116; zero, one, or more than one tower 118; zero, one, or more than one communication manager 120; and/or zero, one, or more than one computing device 122. As such, the illustrated embodiment should be understood as being illustrative, and should not be construed as being limiting in any way.

Figure 2:
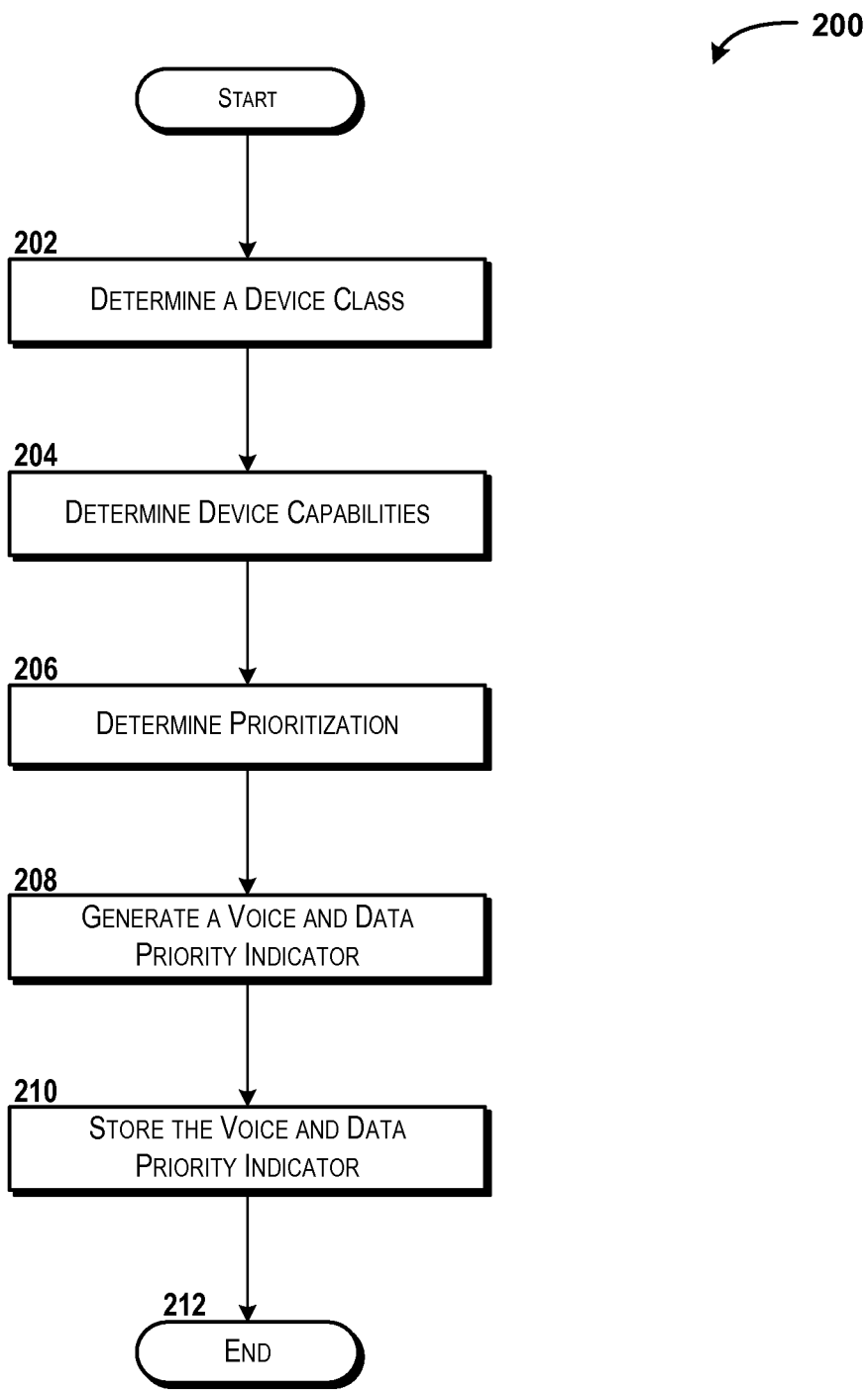
FIG. 2 is a flow diagram showing aspects of a method for setting a voice and data priority indicator and including the voice and data priority indicator as part of a registration message, according to an illustrative embodiment.

Turning now to FIG. 2, aspects of a method 200 for setting a voice and data priority indicator and including the voice and data priority indicator as part of a registration message will be described in detail, according to an illustrative embodiment. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the concepts and technologies disclosed herein.

It also should be understood that the methods disclosed herein can be ended at any time and need not be performed in its entirety. Some or all operations of the methods, and/or substantially equivalent operations, can be performed by execution of computer-readable instructions included on a computer storage media, as defined herein. The term "computer-readable instructions," and variants thereof, as used herein, is used expansively to include routines, applications, application modules, program modules, programs, components, data structures, algorithms, and the like. Computer-readable instructions can be implemented on various system configurations including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These states, operations, structural devices, acts, and modules may be implemented in software, in firmware, in special purpose digital logic, and any combination thereof. As used herein, the phrase "cause a processor to perform operations" and variants thereof is used to refer to causing a processor of a computing system or device, such as the communication device 102, the computing device 122, and/or the communication manager 120, to perform one or more operations and/or causing the processor to direct other components of the computing system or device to perform one or more of the operations.

For purposes of illustrating and describing the concepts of the present disclosure, the method 200 is described as being performed by the communication device 102 via execution of one or more software modules such as, for example, the voice and data priority application 108. It should be understood that additional and/or alternative devices and/or network nodes can provide the functionality described herein via execution of one or more modules, applications, and/or other software including, but not limited to, the voice and data priority application 108. For example, as shown in FIG. 1, some or all of the operations of the method 200 can be executed by the computing device 122 via execution of various application programs including, but not limited to, a voice and data priority application 108. Thus, the illustrated embodiments are illustrative, and should not be viewed as being limiting in any way.

The method 200 begins at operation 202. At operation 202, the communication device 102 determines a device class. According to various embodiments of the concepts and technologies described herein, a "device class" or "class of device" can be used to refer to whether a device is stationary or mobile. According to various embodiments, an indication for how to deal with degrading data and/or voice communications may be more relevant for a mobile device such as a smartphone or the like, relative to a stationary device such as a set-top box, or the like. Thus, the device class can indicate whether a device for which the voice and data priority indicator 110 is being generated or stored is mobile or moveable, or if the device is stationary.

According to some embodiments of the concepts and technologies described herein, where the voice and data priority indicator 110 includes a multi-bit indicator, the device class bit can be set to zero ("0") if the device is stationary and one ("1") if the device is mobile. It should be understood, of course, that the device class bit can instead be set to zero ("0") for a mobile device and one ("1") for a stationary device. Because non-binary bits may be used, because there may be more than two classes of devices, and/or because various types of binary indicators aside from one and zero may be used in accordance with various embodiments of the concepts and technologies described herein, it should be understood that this example is illustrative and therefore should not be construed as being limiting in any way.

From operation 202, the method 200 proceeds to operation 204. At operation 204, the communication device 102 determines device capabilities. According to various embodiments, the communication device 102 can determine if the communication device 102 is capable of voice communications and if the communication device 102 is capable of data communications. The communication device 102 can determine its voice and data capabilities in a variety of ways such as, for example, determining if a voice channel or data channel is available for communications, by determining if the device is configured to access voice channels or data channels, by accessing capability indicators associated with the device, combinations thereof, or the like. Because the communication device 102 can determine its voice and/or data capabilities in additional and/or alternative ways, it should be understood that these examples are illustrative and therefore should not be construed as being limiting in any way.

According to some embodiments of the concepts and technologies described herein, where the voice and data priority indicator 110 includes a multi-bit indicator, two or more bits can be used to indicate device capabilities. For example, the voice and data priority indicator 110 can include a bit for voice capabilities and/or a bit for data capabilities. In some embodiments, the data capabilities bit can be set to zero ("0") if the device is data capable and one ("1") if the device is not data capable. In some other embodiments, the data capabilities bit can be set to zero ("0") if the device is not data capable and one ("1") if the device is data capable. Because non-binary bits may be used, because there may be more than two definitions of data capabilities, and/or because various types of binary indicators aside from one and zero may be used in accordance with various embodiments of the concepts and technologies described herein, it should be understood that this example is illustrative and therefore should not be construed as being limiting in any way.

Similarly, in some embodiments the voice capabilities bit can be set to zero ("0") if the device is voice capable and one ("1") if the device is not voice capable. In some other embodiments, the voice capabilities bit can be set to zero ("0") if the device is not voice capable and one ("1") if the device is voice capable. Because non-binary bits may be used, because there may be more than two definitions of voice capabilities, and/or because various types of binary indicators aside from one and zero may be used in accordance with various embodiments of the concepts and technologies described herein, it should be understood that this example is illustrative and therefore should not be construed as being limiting in any way.

From operation 204, the method 200 proceeds to operation 206. At operation 206, the communication device 102 determines prioritization for communications conducted using the communication device 102. According to various embodiments of the concepts and technologies described herein, the prioritization determined in operation 206 can define if data communications associated with the communication device 102 are to be suspended, downgraded, diminished, or otherwise changed in response to degradation in voice communications associated with the communication device 102. According to some other embodiments of the concepts and technologies described herein, the prioritization determined in operation 206 can define if voice communications associated with the communication device 102 are to be suspended, downgraded, diminished, or otherwise changed in response to degradation in data communications associated with the communication device 102. As such, it can be appreciated that the prioritization determined in operation 206 can define whether or not voice or data communications are to be suspended, degraded, or otherwise changed in response to degradation in data or voice communications, respectively.

According to some embodiments of the concepts and technologies described herein, where the voice and data priority indicator 110 includes a multi-bit indicator, one or more bits can be used to indicate a prioritization setting or preference. For example, the voice and data priority indicator 110 can include a bit for prioritization. In some embodiments, the prioritization bit can be set to zero ("0") if data communications are to be suspended or downgraded in response to a degradation in voice communications and one ("1") if the data communications are not to be suspended or downgraded in response to a degradation in voice communications. In some other embodiments, the prioritization bit can be set to zero ("0") if voice communications are to be suspended or downgraded in response to a degradation in data communications and one ("1") if the voice communications are not to be suspended or downgraded in response to a degradation in data communications. Because non-binary bits may be used, because there may be more than two definitions of prioritization, and/or because various types of binary indicators aside from one and zero may be used in accordance with various embodiments of the concepts and technologies described herein, it should be understood that this example is illustrative and therefore should not be construed as being limiting in any way.

From operation 206, the method 200 proceeds to operation 208. At operation 208, the communication device 102 generates a voice and data priority indicator such as the voice and data priority indicator 110. In some embodiments of the concepts and technologies described herein, the voice and data priority indicator 110 can include a single-bit or multi-bit indicator. In one particular embodiment, the voice and data priority indicator 110 can include a four-bit indicator.

As such, operation 208 can include generating the four bits for the voice and data priority indicator 110. As explained above, the four bits can include a bit that indicates a voice capability of a device, a bit that indicates a data capability of a device, a device class that indicates whether a device is stationary or mobile, a prioritization bit that indicates if data or voice are to be affected in response to degradation of other communications, other bits, combinations thereof, or the like. In some embodiments of the concepts and technologies described herein, the voice and data priority indicator 110 can be configured by the communication device 102 and/or other devices for submission within, with, or as part of a registration message 112, for example as a registration message element that can be submitted to a device or network to register the communication device 102 with the network. It should be understood that this example is illustrative and therefore should not be construed as being limiting in any way.

From operation 208, the method 200 proceeds to operation 210. At operation 210, the communication device 102 stores the voice and data priority indicator 110. The voice and data priority indicator 110 can be stored at the communication device 102 and/or elsewhere. In some embodiments, the voice and data priority indicator 110 can be stored at a memory or other data storage device associated with the communication device 102. In some embodiments, the voice and data priority indicator 110 can be stored by a subscriber identity device such as a SIM card or other subscriber or device identification modules or cards. Because the voice and data priority indicator 110 can be stored in any desired data storage location and/or devices, it should be understood that these examples are illustrative and therefore should not be construed as being limiting in any way.

From operation 210, the method 200 proceeds to operation 212. The method 200 ends at operation 212.

Figure 3:
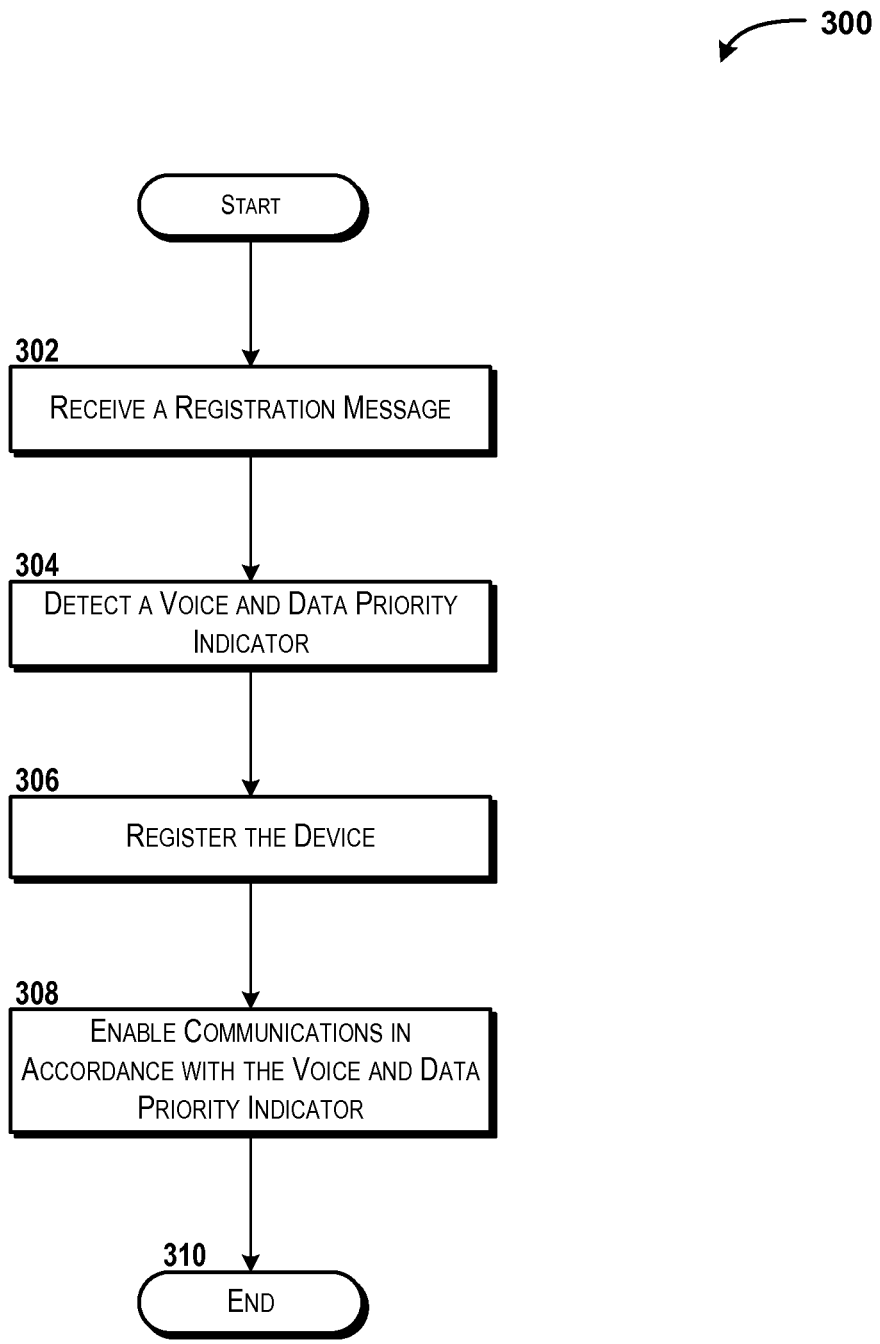
FIG. 3 is a flow diagram showing aspects of a method for communicating in accordance with a voice and data priority indicator included in a registration message, according to another illustrative embodiment.

Turning now to FIG. 3, aspects of a method 300 for communicating in accordance with a voice and data priority indicator included in a registration message will be described in detail, according to an illustrative embodiment. For purposes of illustrating and describing the concepts of the present disclosure, the method 300 is described as being performed by the communication manager 120 via execution of one or more software modules such as, for example, a communication manager module or application. It should be understood that additional and/or alternative devices and/or network nodes can provide the functionality described herein via execution of one or more modules, applications, and/or other software. Thus, the illustrated embodiments are illustrative, and should not be viewed as being limiting in any way.

The method 300 begins at operation 302. At operation 302, the communication manager 120 receives a registration message 112. As explained above, the registration message 112 can be received from various devices such as, for example, the communication device 102 or other devices. The registration message 112 can be received at various times, for example upon powering up of the communication device 102, upon roaming of the communication device 102, upon connecting or reconnecting to network hardware, and/or at other times. Because various devices including, but not limited to, the communication device 102 can transmit the registration message 112, it should be understood that these examples are illustrative and therefore should not be construed as being limiting in any way.

From operation 302, the method 300 proceeds to operation 304. At operation 304, the communication manager 120 detects a voice and data priority indicator 110 in the registration message 112 received in operation 302. Because the voice and data priority indicator 110 can be a header or element of the registration message 112, operation 304 can correspond to the communication manager 120 analyzing or parsing the registration message 112 and recognizing the voice and data priority indicator 110 in the registration message 112.

Additionally, or alternatively, operation 304 can correspond to the communication manager 120 searching the registration message 112 for the voice and data priority indicator 110 and/or other devices, systems, modules, or the like indicating that the voice and data priority indicator 110 is included in the registration message 112. Because the presence of the voice and data priority indicator 110 in the registration message 112 can occur in a variety of manners, it should be understood that these examples are illustrative and therefore should not be construed as being limiting in any way.

From operation 304, the method 300 proceeds to operation 306. At operation 306, the communication manager 120 registers the device that sent the registration message 112 received in operation 302. According to various embodiments, the communication manager 120 can register the device that sent the registration message with the wireless network 114 and/or with a particular device, system, or node such as, for example, the BTS 116, or the like. As noted above, registration of the device that sent the registration message 112 can occur at the network level, the device level, or even the component level (e.g., a radio, transceiver, or the like).

As such, some embodiments of the concepts and technologies described herein allow registration of the device that sent the registration message 112 without requiring software or the like and/or without involving devices, nodes, or modules outside of a particular radio, transceiver, receiver, or transmitter that is involved in providing communications capabilities to the device that generated the registration message 112. It should be understood that these examples are illustrative and therefore should not be construed as being limiting in any way.

From operation 306, the method 300 proceeds to operation 308. At operation 308, the communication manager 120 enables communications in accordance with the voice and data priority indicator 110 detected in operation 304. In some embodiments, the communication manager 120 can communicate the communication preferences identified by the registration message 112 to various hardware, software, or the like within or associated with the wireless network 114. As explained above, the preferences can be applied at the device level without requiring network interactions, if desired. Thus, enabling the communications can include operating a radio or the like in accordance with the preferences and/or passing the preferences on to other devices, systems, networks, or the like. It should be understood that this example is illustrative and therefore should not be construed as being limiting in any way.

In some embodiments, the communication manager 120 can be configured to maintain a table, database, or other data structure that can define a network tuning profile. The network tuning profile can defined for specific iterations of the voice and data priority indicator 110. An example of one illustrative network turning profile table or other data structure is shown in FIG. 4.

As can be seen in FIG. 4, a table 400 can be configured to embody network tuning profiles and to associate multiple network tuning profiles with iterations of the voice and data priority indicator 110. It should be understood that the illustrated table 400 is illustrative of some contemplated embodiments of possible network turning profiles. As such, the embodiment shown in FIG. 4 should not be construed as being limiting in any way.

As shown in FIG. 4, a row 402 of the table 400 can correspond to one iteration of the voice and data priority indicator 110. In the row 402, the voice and data priority indicator 110 can be 1,1,1,1, which can indicate that the device that transmitted the voice and data priority indicator 110 is voice capable, data capable, stationary, and that data is to be prioritized. It can be appreciated that this is one example embodiment of what the voice and data priority indicator 110 1,1,1,1, can indicate, and as such, this example should not be construed as being limiting in any way.

As shown in FIG. 4, this voice and data priority indicator 110 can correspond, for example, to a multi-radio access bearer ("mRAB") capable device that is stationary and is configured to prioritize data communications over voice communications. As shown in FIG. 4, the network tuning profile can set various parameters for communicating with the device that generated this voice and data priority indicator 110 by configuring radio channels, a scheduler, and defining if voice and/or data are to be dropped if marginal.

Similarly, a row 404 of the table 400 can correspond to a second iteration of the voice and data priority indicator 110. In the row 404, the voice and data priority indicator 110 can be 1,1,1,0, which can indicate that the device that transmitted the voice and data priority indicator 110 is voice capable, data capable, stationary, and that voice is to be prioritized. It can be appreciated that this is one example embodiment of what the voice and data priority indicator 110 1,1,1,0, can indicate, and as such, this example should not be construed as being limiting in any way.

As shown in FIG. 4, this voice and data priority indicator 110 can correspond, for example, to a multi-radio access bearer ("mRAB") capable device that is stationary and is configured to prioritize voice communications over data communications. As shown in FIG. 4, the network tuning profile can set various parameters for communicating with the device that generated this voice and data priority indicator 110 by configuring radio channels, a scheduler, and defining if voice and/or data are to be dropped if marginal. As noted above, the two example rows described herein are examples and should not be construed as being limiting in any way.

From operation 308, the method 300 proceeds to operation 310. The method 300 ends at operation 310.

Figure 5:
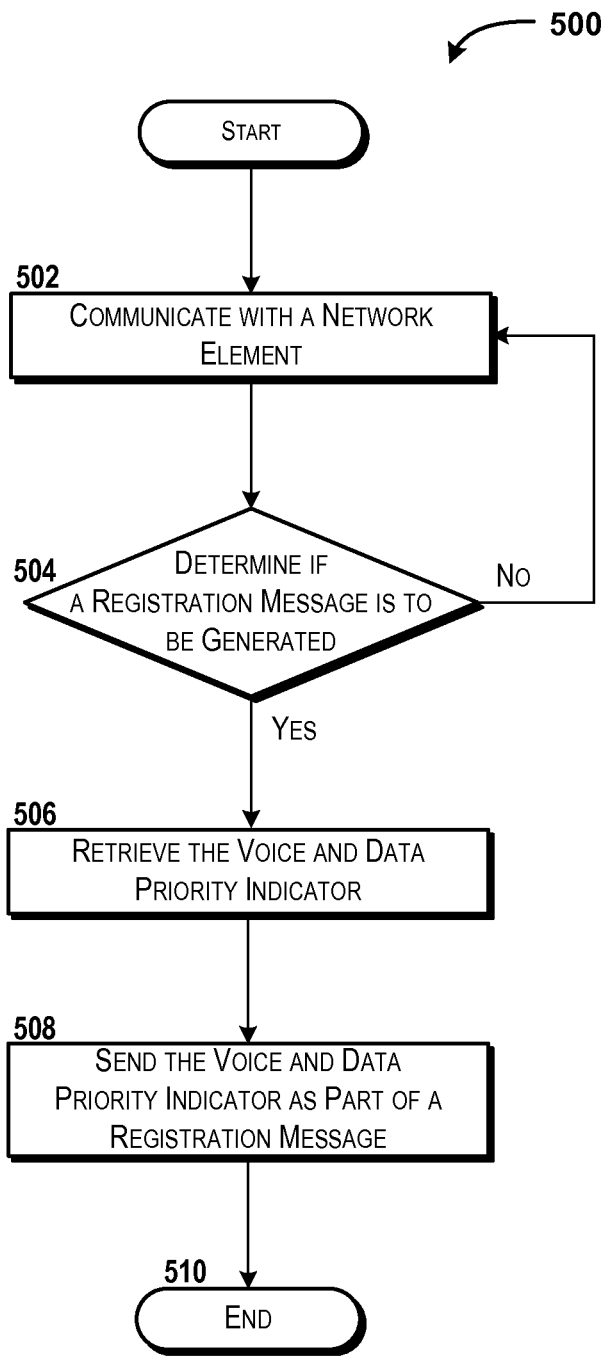
FIG. 5 is a flow diagram showing aspects of a method for updating a voice and data priority indicator, according to another illustrative embodiment.

Turning now to FIG. 5, aspects of a method 500 for updating a voice and data priority indicator will be described in detail, according to an illustrative embodiment. For purposes of illustrating and describing the concepts of the present disclosure, the method 500 is described as being performed by the communication device 102 via execution of one or more software modules such as, for example, the voice and data priority application 108. It should be understood that additional and/or alternative devices and/or network nodes can provide the functionality described herein via execution of one or more modules, applications, and/or other software including, but not limited to, the voice and data priority application 108. Thus, the illustrated embodiments are illustrative, and should not be viewed as being limiting in any way.

The method 500 begins at operation 502. At operation 502, the communication device 102 communicates with a network element. In some embodiments, for example, the communication device 102 can communicate with a wireless network 114 or an element thereof such as, for example, a BTS 116. In some embodiments, the communication illustrated in operation 502 can occur via an antenna, a radio, a receiver, a transceiver, a combiner, and/or other hardware associated with the BTS 116 and/or a tower 118. Because communication with wireless networks such as the wireless network 114 are generally understood, the functionality of the communication device 102 with regard to operation 502 will not be described in additional detail.

From operation 502, the method 500 proceeds to operation 504. At operation 504, the communication device 102 determines if a registration message 112 is to be generated. As explained above, the communication device 102 can be configured, via execution of the voice and data priority application 108, to generate the registration message 112 at various times. According to various embodiments of the concepts and technologies described herein, the registration message 112 can be generated when the communication device 102 is powered on, when communication device 102 detects communication with a network or network component, when the communication device roams onto a different network or connects to a new network or network component, according to various schedules and/or upon expiration of various time intervals, combinations thereof, or the like. Because the communication device 102 can determine that the registration message 112 is to be generated at various times and/or in response to various conditions, it should be understood that these examples are illustrative and therefore should not be construed as being limiting in any way.

If the communication device 102 determines, in operation 504, that the registration message 112 is not be generated, the method 500 can return to operation 502. As such, it can be appreciated that the method 500 can repeat operations 502-404 until the communication device 102 determines, in any iteration of operation 504, that a registration message 112 is to be generated. Additionally, or alternatively, the execution of the method 500 can pause at operation 504 until the communication device 102 determines, in any iteration of operation 504, that the registration message 112 is to be generated. If the communication device 102 determines, in any iteration of operation 504, that the registration message 112 is to be generated, the method 500 can proceed to operation 506.

At operation 506, the communication device 102 can retrieve the voice and data priority indicator 110. According to various embodiments of the concepts and technologies described herein, the communication device 102 can retrieve the voice and data priority indicator 110 from a SIM module, a memory, and/or other data storage devices or locations. According to some other embodiments, the communication device 102 can store various instructions that, when executed, cause the communication device 102 to generate the voice and data priority indicator 110. Because the communication device 102 can retrieve or generate the voice and data priority indicator 110 at various times and/or in response to various conditions, it should be understood that these examples are illustrative and therefore should not be construed as being limiting in any way.

From operation 506, the method 500 proceeds to operation 508. At operation 508, the communication device 102 can send the voice and data priority indicator 110 as part of a registration message 112. In various embodiments, the voice and data priority indicator 110 can be included as a header or element of a registration message 112. For example, some embodiments of the concepts and technologies described herein are configured to insert the voice and data priority indicator 110 into the registration message 112 by using one or more information elements of the registration message 112.

In one contemplated embodiment of the concepts and technologies described herein, the "DoesNotBenefitFromBatteryConsumptionOptimisation" information element of a registration message 112 can be used to store the voice and data priority indicator 110. In particular, some embodiments of the concepts and technologies described herein can use the "DoesNotBenefitFromBatteryConsumptionOptimisation" information element because this element may not be used in registration messages 112. Thus, some embodiments of the concepts and technologies described herein can include the voice and data priority indicator 110 without adding new information elements to the registration message 112 and/or without any additional communications (outside of the registration message 112). It should be understood that these examples are illustrative and therefore should not be construed as being limiting in any way.

From operation 508, the method 500 proceeds to operation 510. The method 500 ends at operation 510.

Figure 6:
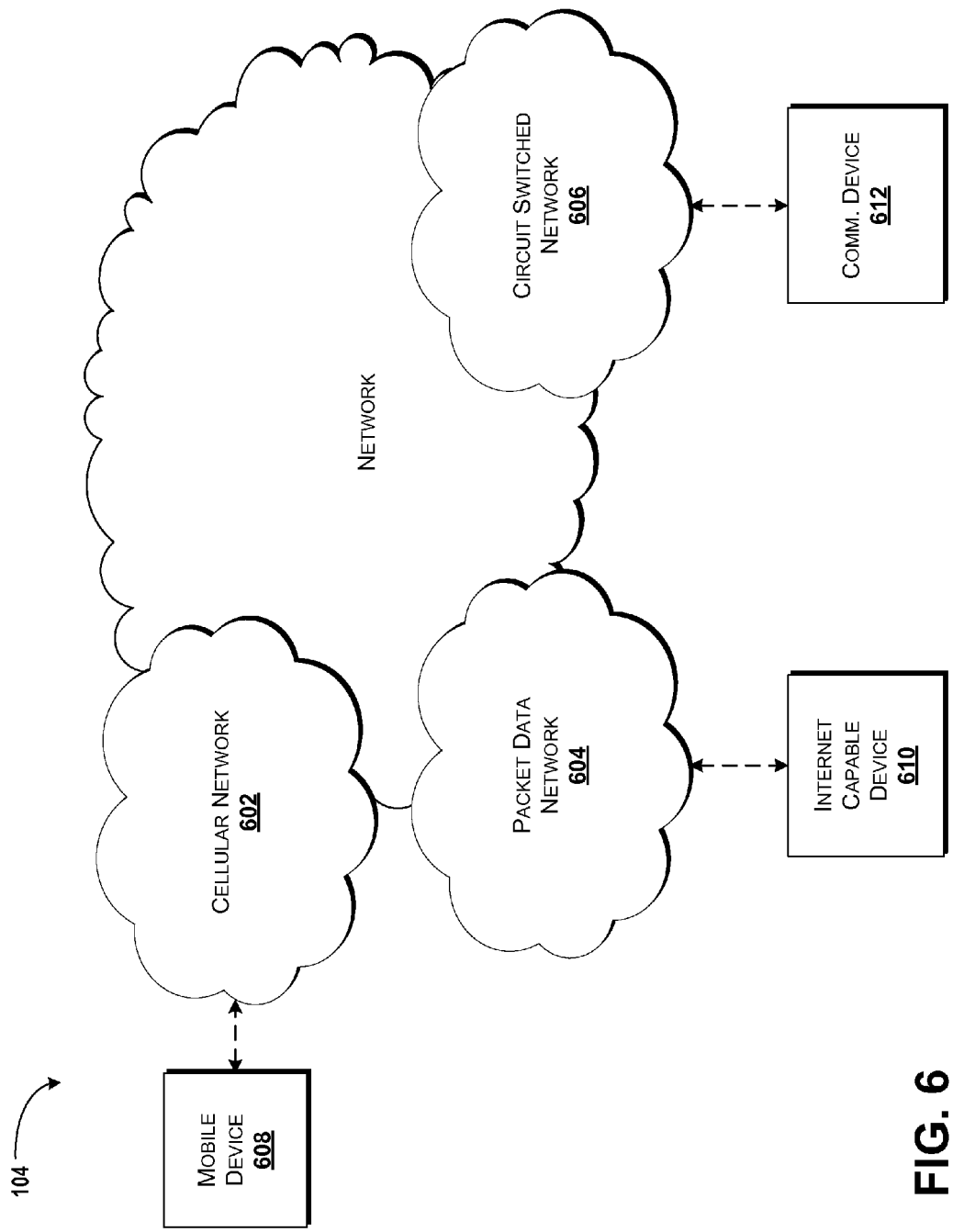
FIG. 6 schematically illustrates a network, according to an illustrative embodiment.

Turning now to FIG. 6, additional details of the network 104 are illustrated, according to an illustrative embodiment. The network 104 includes a cellular network 602, which can be one embodiment of the wireless network 114 described herein; a packet data network 604, for example, the Internet; and a circuit switched network 606, for example, a publicly switched telephone network ("PSTN"). The cellular network 602 includes various components such as, but not limited to, base transceiver stations ("BTSs"), Node-B's or e-Node-B's, base station controllers ("BSCs"), radio network controllers ("RNCs"), mobile switching centers ("MSCs"), mobile management entities ("MMEs"), short message service centers ("SMSCs"), multimedia messaging service centers ("MMSCs"), home location registers ("HLRs"), home subscriber servers ("HSSs"), visitor location registers ("VLRs"), charging platforms, billing platforms, voicemail platforms, GPRS core network components, location service nodes, an IP Multimedia Subsystem ("IMS"), and the like. The cellular network 602 also includes radios and nodes for receiving and transmitting voice, data, and combinations thereof to and from radio transceivers, networks, the packet data network 604, and the circuit switched network 606.

A mobile communication device 608, such as, for example, a cellular telephone, a user equipment, a mobile terminal, a PDA, a laptop computer, a handheld computer, and combinations thereof, can be operatively connected to the cellular network 602. The cellular network 602 can be configured as a 2G GSM network and can provide data communications via GPRS and/or EDGE. Additionally, or alternatively, the cellular network 602 can be configured as a 3G UMTS network and can provide data communications via the HSPA protocol family, for example, HSDPA, EUL (also referred to as HSUPA), and HSPA+. The cellular network 602 also is compatible with 4G mobile communications standards as well as evolved and future mobile standards.

The packet data network 604 includes various devices, for example, servers, computers, databases, and other devices in communication with another, as is generally known. The packet data network 604 devices are accessible via one or more network links. The servers often store various files that are provided to a requesting device such as, for example, a computer, a terminal, a smartphone, or the like. Typically, the requesting device includes software (a "browser") for executing a web page in a format readable by the browser or other software. Other files and/or data may be accessible via "links" in the retrieved files, as is generally known. In some embodiments, the packet data network 604 includes or is in communication with the Internet. The circuit switched network 606 includes various hardware and software for providing circuit switched communications. The circuit switched network 606 may include, or may be, what is often referred to as a plain old telephone system (POTS). The functionality of a circuit switched network 606 or other circuit-switched network are generally known and will not be described herein in detail.

The illustrated cellular network 602 is shown in communication with the packet data network 604 and a circuit switched network 606, though it should be appreciated that this is not necessarily the case. One or more Internet-capable devices 610, for example, a PC, a laptop, a portable device, or another suitable device, can communicate with one or more cellular networks 602, and devices connected thereto, through the packet data network 604. It also should be appreciated that the Internet-capable device 610 can communicate with the packet data network 604 through the circuit switched network 606, the cellular network 602, and/or via other networks (not illustrated).

As illustrated, a communication device 612, for example, a telephone, facsimile machine, modem, computer, or the like, can be in communication with the circuit switched network 606, and therethrough to the packet data network 604 and/or the cellular network 602. It should be appreciated that the communication device 612 can be an Internet-capable device, and can be substantially similar to the Internet-capable device 610. In the specification, the network 104 is used to refer broadly to any combination of the networks 602, 604, 606. It should be appreciated that substantially all of the functionality described with reference to the network 104 can be performed by the cellular network 602, the packet data network 604, and/or the circuit switched network 606, alone or in combination with other networks, network elements, and the like.

Figure 7:
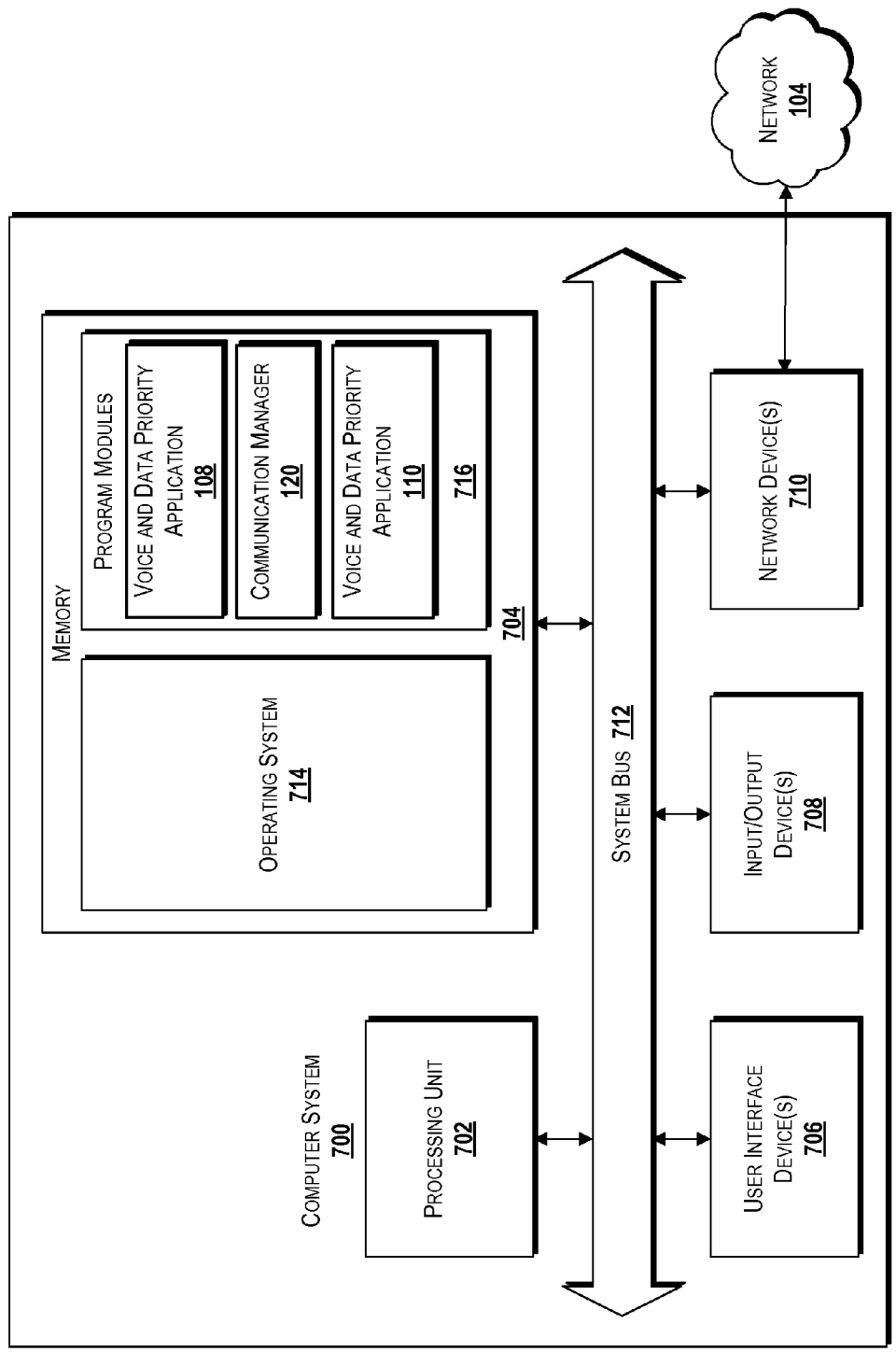
FIG. 7 is a block diagram illustrating an example computer system configured to set a voice and data priority indicator, according to some illustrative embodiments.

FIG. 7 is a block diagram illustrating a computer system 700 configured to provide the functionality described herein for setting voice and data priority using a registration message, in accordance with various embodiments of the concepts and technologies disclosed herein. The computer system 700 includes a processing unit 702, a memory 704, one or more user interface devices 706, one or more input/output ("I/O") devices 708, and one or more network devices 710, each of which is operatively connected to a system bus 712. The bus 712 enables bi-directional communication between the processing unit 702, the memory 704, the user interface devices 706, the I/O devices 708, and the network devices 710.

The processing unit 702 may be a standard central processor that performs arithmetic and logical operations, a more specific purpose programmable logic controller ("PLC"), a programmable gate array, or other type of processor known to those skilled in the art and suitable for controlling the operation of the server computer. As used herein, the word "processor" and/or the phrase "processing unit" when used with regard to any architecture or system can include multiple processors or processing units distributed across and/or operating in parallel in a single machine or in multiple machines. Furthermore, processors and/or processing units can include virtual processors. Processors and processing units also can include state machines, application-specific integrated circuits ("ASICs"), combinations thereof, or the like. Because processors and/or processing units are generally known, the processors and processing units disclosed herein will not be described in further detail herein.

The memory 704 communicates with the processing unit 702 via the system bus 712. In some embodiments, the memory 704 is operatively connected to a memory controller (not shown) that enables communication with the processing unit 702 via the system bus 712. The memory 704 includes an operating system 714 and one or more program modules 716. The operating system 714 can include, but is not limited to, members of the WINDOWS, WINDOWS CE, and/or WINDOWS MOBILE families of operating systems from MICROSOFT CORPORATION, the LINUX family of operating systems, the SYMBIAN family of operating systems from SYMBIAN LIMITED, the BREW family of operating systems from QUALCOMM CORPORATION, the MAC OS, iOS, and/or LEOPARD families of operating systems from APPLE CORPORATION, the FREEBSD family of operating systems, the SOLARIS family of operating systems from ORACLE CORPORATION, other operating systems, and the like.

The program modules 716 may include various software and/or program modules described herein. In some embodiments, for example, the program modules 716 include the voice and data priority application 108 and/or the communication manager 120 illustrated and described in FIG. 1. These and/or other programs can be embodied in computer-readable media containing instructions that, when executed by the processing unit 702, perform one or more of the methods 200, 300, 500 described in detail above with respect to FIGS. 2-3 and 5. According to embodiments, the program modules 716 may be embodied in hardware, software, firmware, or any combination thereof. Although not shown in FIG. 7, it should be understood that the memory 704 also can be configured to store the voice and data priority indicator 110 and/or other data, if desired.

By way of example, and not limitation, computer-readable media may include any available computer storage media or communication media that can be accessed by the computer system 700. Communication media includes computer-readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

Computer storage media includes volatile and non-volatile, removable and non-removable media implemented in any method or technology for storage of information such as computer-readable instructions, data structures, program modules, or other data. Computer storage media includes, but is not limited to, RAM, ROM, Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer system 700. In the claims, the phrase "computer storage medium" and variations thereof does not include waves or signals per se and/or communication media.

The user interface devices 706 may include one or more devices with which a user accesses the computer system 700. The user interface devices 706 may include, but are not limited to, computers, servers, personal digital assistants, cellular phones, or any suitable computing devices. The I/O devices 708 enable a user to interface with the program modules 716. In one embodiment, the I/O devices 708 are operatively connected to an I/O controller (not shown) that enables communication with the processing unit 702 via the system bus 712. The I/O devices 708 may include one or more input devices, such as, but not limited to, a keyboard, a mouse, or an electronic stylus. Further, the I/O devices 708 may include one or more output devices, such as, but not limited to, a display screen or a printer.

The network devices 710 enable the computer system 700 to communicate with other networks or remote systems via a network, such as the network 104. Examples of the network devices 710 include, but are not limited to, a modem, a radio frequency ("RF") or infrared ("IR") transceiver, a telephonic interface, a bridge, a router, or a network card. The network 104 may include a wireless network such as, but not limited to, a Wireless Local Area Network ("WLAN") such as a WI-FI network, a Wireless Wide Area Network ("WWAN"), a Wireless Personal Area Network ("WPAN") such as BLUETOOTH, a Wireless Metropolitan Area Network ("WMAN") such a WiMAX network, or a cellular network. Alternatively, the network 104 may be a wired network such as, but not limited to, a Wide Area Network ("WAN") such as the Internet, a Local Area Network ("LAN") such as the Ethernet, a wired Personal Area Network ("PAN"), or a wired Metropolitan Area Network ("MAN").

Figure 8:
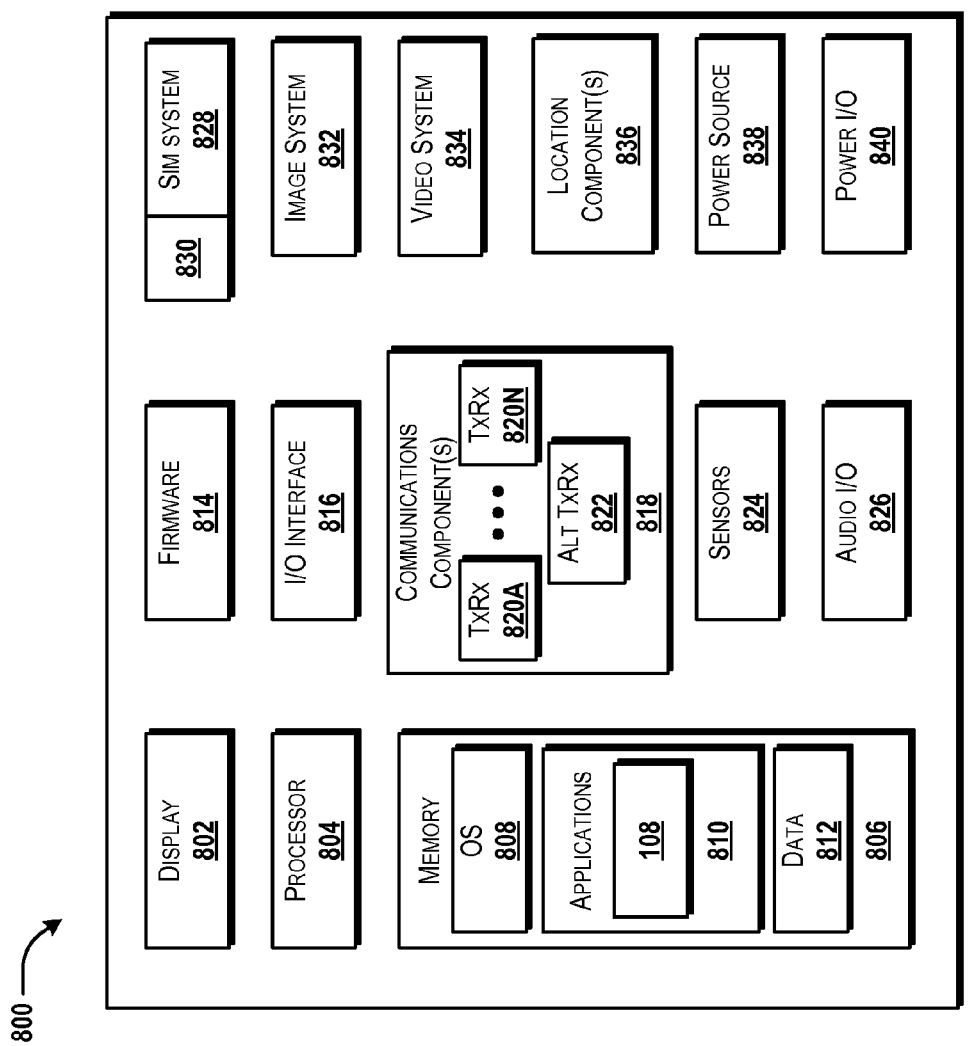
FIG. 8 is a block diagram illustrating an example mobile device configured to set a voice and data priority using a registration message, according to some illustrative embodiments.

Turning now to FIG. 8, an illustrative mobile device 800 and components thereof will be described. In some embodiments, the communication device 102 described above with reference to FIGS. 1-5 can be configured as and/or can have an architecture similar or identical to the mobile device 800 described herein in FIG. 8. It should be understood, however, that the communication device 102 may or may not include the functionality described herein with reference to FIG. 8. While connections are not shown between the various components illustrated in FIG. 8, it should be understood that some, none, or all of the components illustrated in FIG. 8 can be configured to interact with one other to carry out various device functions. In some embodiments, the components are arranged so as to communicate via one or more busses (not shown). Thus, it should be understood that FIG. 8 and the following description are intended to provide a general understanding of a suitable environment in which various aspects of embodiments can be implemented, and should not be construed as being limiting in any way.

As illustrated in FIG. 8, the mobile device 800 can include a display 802 for displaying data. According to various embodiments, the display 802 can be configured to display various graphical user interface ("GUI") elements such as text, images, video, virtual keypads and/or keyboards, messaging data, notification messages, metadata, internet content, device status, time, date, calendar data, device preferences, map and location data, combinations thereof, and/or the like. The mobile device 800 also can include a processor 804 and a memory or other data storage device ("memory") 806. The processor 804 can be configured to process data and/or can execute computer-executable instructions stored in the memory 806. The computer-executable instructions executed by the processor 804 can include, for example, an operating system 808, one or more applications 810 such as the voice and data priority application 108, other computer-executable instructions stored in a memory 806, or the like. In some embodiments, the applications 810 also can include a UI application (not illustrated in FIG. 8).

The UI application can interface with the operating system 808, such as the operating system 106 shown in FIG. 1, to facilitate user interaction with functionality and/or data stored at the mobile device 800 and/or stored elsewhere. In some embodiments, the operating system 808 can include a member of the SYMBIAN OS family of operating systems from SYMBIAN LIMITED, a member of the WINDOWS MOBILE OS and/or WINDOWS PHONE OS families of operating systems from MICROSOFT CORPORATION, a member of the PALM WEBOS family of operating systems from HEWLETT PACKARD CORPORATION, a member of the BLACKBERRY OS family of operating systems from RESEARCH IN MOTION LIMITED, a member of the IOS family of operating systems from APPLE INC., a member of the ANDROID OS family of operating systems from GOOGLE INC., and/or other operating systems. These operating systems are merely illustrative of some contemplated operating systems that may be used in accordance with various embodiments of the concepts and technologies described herein and therefore should not be construed as being limiting in any way.

The UI application can be executed by the processor 804 to aid a user in entering content, to show voice and data priority choices and/or to configure how and/or when voice and data priority indicators 110 are provided to various entities, configuring settings, manipulating address book content and/or settings, multimode interaction, interacting with other applications 810, and otherwise facilitating user interaction with the operating system 808, the applications 810, and/or other types or instances of data 812 that can be stored at the mobile device 800. The data 812 can include, for example, the voice and data priority indicator 110 and/or other applications or program modules. According to various embodiments, the data 812 can include, for example, presence applications, visual voice mail applications, messaging applications, text-to-speech and speech-to-text applications, add-ons, plug-ins, email applications, music applications, video applications, camera applications, location-based service applications, power conservation applications, game applications, productivity applications, entertainment applications, enterprise applications, combinations thereof, and the like. The applications 810, the data 812, and/or portions thereof can be stored in the memory 806 and/or in a firmware 814, and can be executed by the processor 804. The firmware 814 also can store code for execution during device power up and power down operations. It can be appreciated that the firmware 814 can be stored in a volatile or non-volatile data storage device including, but not limited to, the memory 806 and/or a portion thereof.

The mobile device 800 also can include an input/output ("I/O") interface 816. The I/O interfaced 816 can be configured to support the input/output of data such as location information, voice capabilities, data capabilities, voice/data priority choices, prioritization choices, user information, organization information, presence status information, user IDs, passwords, and application initiation (start-up) requests. In some embodiments, the I/O interface 816 can include a hardwire connection such as a universal serial bus ("USB") port, a mini-USB port, a micro-USB port, an audio jack, a PS2 port, an IEEE 1394 ("FIREWIRE") port, a serial port, a parallel port, an Ethernet (RJ45) port, an RJ11 port, a proprietary port, combinations thereof, or the like. In some embodiments, the mobile device 800 can be configured to synchronize with another device to transfer content to and/or from the mobile device 800. In some embodiments, the mobile device 800 can be configured to receive updates to one or more of the applications 810 via the I/O interface 816, though this is not necessarily the case. In some embodiments, the I/O interface 816 accepts I/O devices such as keyboards, keypads, mice, interface tethers, printers, plotters, external storage, touch/multi-touch screens, touch pads, trackballs, joysticks, microphones, remote control devices, displays, projectors, medical equipment (e.g., stethoscopes, heart monitors, and other health metric monitors), modems, routers, external power sources, docking stations, combinations thereof, and the like. It should be appreciated that the I/O interface 816 may be used for communications between the mobile device 800 and a network device or local device.

The mobile device 800 also can include a communications component 818. The communications component 818 can be configured to interface with the processor 804 to facilitate wired and/or wireless communications with one or more networks such as the network 104 and/or the wireless network 114 described herein. In some embodiments, other networks include networks that utilize non-cellular wireless technologies such as WI-FI or WIMAX. In some embodiments, the communications component 818 includes a multimode communications subsystem for facilitating communications via the cellular network and one or more other networks.

The communications component 818, in some embodiments, includes one or more transceivers. The one or more transceivers, if included, can be configured to communicate over the same and/or different wireless technology standards with respect to one another. For example, in some embodiments one or more of the transceivers of the communications component 818 may be configured to communicate using GSM, CDMAONE, CDMA2000, LTE, and various other 2G, 2.5G, 3G, 4G, and greater generation technology standards. Moreover, the communications component 818 may facilitate communications over various channel access methods (which may or may not be used by the aforementioned standards) including, but not limited to, TDMA, FDMA, W-CDMA, OFDM, SDMA, and the like.

In addition, the communications component 818 may facilitate data communications using GPRS, EDGE, the HSPA protocol family including HSDPA, EUL or otherwise termed HSUPA, HSPA+, and various other current and future wireless data access standards. In the illustrated embodiment, the communications component 818 can include a first transceiver ("TxRx") 820A that can operate in a first communications mode (e.g., GSM). The communications component 818 also can include an $N^{th}$ transceiver ("TxRx") 820N that can operate in a second communications mode relative to the first transceiver 820A (e.g., UMTS). While two transceivers 820A-N (hereinafter collectively and/or generically referred to as "transceivers 820") are shown in FIG. 8, it should be appreciated that less than two, two, and/or more than two transceivers 820 can be included in the communications component 818.

The communications component 818 also can include an alternative transceiver ("Alt TxRx") 822 for supporting other types and/or standards of communications. According to various contemplated embodiments, the alternative transceiver 822 can communicate using various communications technologies such as, for example, WI-FI, WIMAX, BLUETOOTH, infrared, infrared data association ("IRDA"), near field communications ("NFC"), other RF technologies, combinations thereof, and the like. In some embodiments, the communications component 818 also can facilitate reception from terrestrial radio networks, digital satellite radio networks, internet-based radio service networks, combinations thereof, and the like. The communications component 818 can process data from a network such as the Internet, an intranet, a broadband network, a WI-FI hotspot, an Internet service provider ("ISP"), a digital subscriber line ("DSL") provider, a broadband provider, combinations thereof, or the like.

The mobile device 800 also can include one or more sensors 824. The sensors 824 can include temperature sensors, light sensors, air quality sensors, movement sensors, orientation sensors, noise sensors, proximity sensors, or the like. As such, it should be understood that the sensors 824 can include, but are not limited to, accelerometers, magnetometers, gyroscopes, infrared sensors, noise sensors, microphones, combinations thereof, or the like. Additionally, audio capabilities for the mobile device 800 may be provided by an audio I/O component 826. The audio I/O component 826 of the mobile device 800 can include one or more speakers for the output of audio signals, one or more microphones for the collection and/or input of audio signals, and/or other audio input and/or output devices.

The illustrated mobile device 800 also can include a subscriber identity module ("SIM") system 828. The SIM system 828 can include a universal SIM ("USIM"), a universal integrated circuit card ("UICC") and/or other identity devices. The SIM system 828 can include and/or can be connected to or inserted into an interface such as a slot interface 830. In some embodiments, the slot interface 830 can be configured to accept insertion of other identity cards or modules for accessing various types of networks. Additionally, or alternatively, the slot interface 830 can be configured to accept multiple subscriber identity cards. Because other devices and/or modules for identifying users and/or the mobile device 800 are contemplated, it should be understood that these embodiments are illustrative, and should not be construed as being limiting in any way.

The mobile device 800 also can include an image capture and processing system 832 ("image system"). The image system 832 can be configured to capture or otherwise obtain photos, videos, and/or other visual information. As such, the image system 832 can include cameras, lenses, charge-coupled devices ("CCDs"), combinations thereof, or the like. The mobile device 800 may also include a video system 834. The video system 834 can be configured to capture, process, record, modify, and/or store video content. Photos and videos obtained using the image system 832 and the video system 834, respectively, may be added as message content to an MMS message, email message, and sent to another mobile device. The video and/or photo content also can be shared with other devices via various types of data transfers via wired and/or wireless communication devices as described herein.

The mobile device 800 also can include one or more location components 836. The location components 836 can be configured to send and/or receive signals to determine a geographic location of the mobile device 800. According to various embodiments, the location components 836 can send and/or receive signals from global positioning system ("GPS") devices, assisted-GPS ("A-GPS") devices, WI-FI/WIMAX and/or cellular network triangulation data, combinations thereof, and the like. The location component 836 also can be configured to communicate with the communications component 818 to retrieve triangulation data for determining a location of the mobile device 800. In some embodiments, the location component 836 can interface with cellular network nodes, telephone lines, satellites, location transmitters and/or beacons, wireless network transmitters and receivers, combinations thereof, and the like. In some embodiments, the location component 836 can include and/or can communicate with one or more of the sensors 824 such as a compass, an accelerometer, and/or a gyroscope to determine the orientation of the mobile device 800. Using the location component 836, the mobile device 800 can generate and/or receive data to identify its geographic location, or to transmit data used by other devices to determine the location of the mobile device 800. The location component 836 may include multiple components for determining the location and/or orientation of the mobile device 800.

The illustrated mobile device 800 also can include a power source 838. The power source 838 can include one or more batteries, power supplies, power cells, and/or other power subsystems including alternating current ("AC") and/or direct current ("DC") power devices. The power source 838 also can interface with an external power system or charging equipment via a power I/O component 840. Because the mobile device 800 can include additional and/or alternative components, the above embodiment should be understood as being illustrative of one possible operating environment for various embodiments of the concepts and technologies described herein. The described embodiment of the mobile device 800 is illustrative, and should not be construed as being limiting in any way.

Based on the foregoing, it should be appreciated that systems and methods for setting voice and data priority using a registration message have been disclosed herein.

Although the subject matter presented herein has been described in language specific to computer structural features, methodological and transformative acts, specific computing machinery, and computer-readable media, it is to be understood that the concepts and technologies disclosed herein are not necessarily limited to the specific features, acts, or media described herein. Rather, the specific features, acts and mediums are disclosed as example forms of implementing the concepts and technologies disclosed herein.

The subject matter described above is provided by way of illustration only and should not be construed as limiting. Various modifications and changes may be made to the subject matter described herein without following the example embodiments and applications illustrated and described, and without departing from the true spirit and scope of the embodiments of the concepts and technologies disclosed herein.

We claim:

1. A method comprising:
   generating, by a processor that executes a voice and data priority application, a voice and data priority indicator for a communication device;
   storing, by the processor, the voice and data priority indicator at the communication device;
   generating, by the processor, a registration message that comprises the voice and data priority indicator; and
   sending, by the processor, the registration message to a communications network to request registration of the communication device with the communications network.

2. The method of claim 1, wherein the voice and data priority indicator comprises a multi-bit indicator that is included in the registration message.

3. The method of claim 1, wherein the voice and data priority indicator comprises:
   a first bit indicating a voice capability of the communication device;
   a second bit indicating a data capability of the communication device;
   a third bit indicating a class of device for the communication device; and
   a fourth bit indicating if data communications are to be prioritized over voice communications.

4. The method of claim 1, wherein the registration message comprises a DoesNotBenefitFromBatteryConsumptionOptimisation information element, and wherein the DoesNotBenefitFromBatteryConsumptionOptimisation information element comprises the voice and data priority indicator.

5. The method of claim 1, further comprising:
   determining, by the processor, that the voice and data priority indicator is to be updated;
   updating, by the processor, the voice and data priority indicator; and
   sending, by the processor, an updated voice and data priority indicator to a network element.

6. The method of claim 1, wherein the voice and data priority indicator is stored at a subscriber identity module of the communication device.

7. The method of claim 1, wherein the voice and data priority indicator is stored at a data storage device of the communication device.

8. The method of claim 1, wherein the voice and data priority indicator configures a network element for communications in accordance with the voice and data priority indicator.

9. The method of claim 8, wherein the network element comprises a base transceiver station associated with a wireless network.

10. A device comprising:
    a processor; and
    a memory that stores computer-executable instructions that, when executed by the processor, cause the processor to perform operations comprising
       generating a voice and data priority indicator,
       storing the voice and data priority indicator at the memory,
       generating a registration message that comprises the voice and data priority indicator, and
       sending the registration message to a communications network to request registration with the communications network.

11. The device of claim 10, wherein the voice and data priority indicator comprises a multi-bit indicator that is included in the registration message.

12. The device of claim 11, wherein the voice and data priority indicator comprises:
    a first bit indicating a voice capability;
    a second bit indicating a data capability;
    a third bit indicating a class of device; and
    a fourth bit indicating if data communications are to be prioritized over voice communications.

13. The device of claim 10, wherein the registration message comprises a DoesNotBenefitFromBatteryConsumptionOptimisation information element, and wherein the DoesNotBenefitFromBatteryConsumptionOptimisation information element comprises the voice and data priority indicator.

14. The device of claim 10, wherein the computer-executable instructions, when executed by the processor, cause the processor to perform operations further comprising:
    determining that the voice and data priority indicator is to be updated;
    updating the voice and data priority indicator; and
    sending an updated voice and data priority indicator to the communications network.

15. The device of claim 10, wherein the voice and data priority indicator configures a network element for communications in accordance with the voice and data priority indicator.

16. A computer storage medium having stored thereon computer-executable instructions that, when executed by a processor, cause the processor to perform operations comprising:
    generating a voice and data priority indicator for a communication device;
    storing the voice and data priority indicator at the communication device;
    generating a registration message that comprises the voice and data priority indicator; and
    sending the registration message to a communications network to request registration with the communications network.

17. The computer storage medium of claim 16, wherein the voice and data priority indicator comprises a multi-bit that is indicator included in the registration message.

18. The computer storage medium of claim 16, wherein the voice and data priority indicator comprises:
    a first bit indicating a voice capability of the communication device;
    a second bit indicating a data capability of the communication device;

a third bit indicating a class of device for the communication device; and a fourth bit indicating if data communications are to be prioritized over voice communications.

19. The computer storage medium of claim 16, wherein the computer-executable instructions, when executed by the processor, cause the processor to perform operations further comprising:

determining that the voice and data priority indicator is to be updated;

updating the voice and data priority indicator; and sending an updated voice and data priority indicator to the communications network.

20. The computer storage medium of claim 16, wherein the voice and data priority indicator configures a network element for communications in accordance with the voice and data priority indicator.

* * * * *